United States Patent Office 3,489,573
Patented Jan. 13, 1970

3,489,573
PREPARATION OF COLORED FATTY COMPOSITIONS
George W. Brankamp, Reading, Ohio, assignor to The Procter & Gamble Company, Cincinnati, Ohio, a corporation of Ohio
No Drawing. Filed Sept. 27, 1966, Ser. No. 582,236
Int. Cl. A23d 5/00
U.S. Cl. 99—148    3 Claims

ABSTRACT OF THE DISCLOSURE

Fats and oils are provided with heat-stable color by incorporating therein water-soluble dyes in combination with particular polyglycerol esters. Specific examples of suitable polyglycerol esters are decaglycerol trilinoleate and tetraglycerol monooleate.

---

This invention relates to edible fatty compositions; more specifically it deals with heat stable suspensions of water soluble-oil insoluble dyes in liquid or plastic fats.

There are a number of areas in which colored fatty products have utility. For example, colored oils can be used in salad dressings to produce a more appetizing product. Colored plastic fats likewise present a more appealing appearance to many consumers. Colored cooking fats can be used to impart desirable tints to many fried foods and, particularly, to popcorn.

Coloring materials used in edible fatty compositions generally are limited to oil soluble dyes such as lycopene, carotene and other carotenoid pigments. Thus the availability and versatility of dyes for use in edible fatty compositions is seriously restricted. A limited number of water soluble dyes have been used in edible fatty compositions, but only with severe limitations. Examples of such compositions are shown in U.S. Patent 2,524,291 to Hoffman, issued on Oct. 3, 1950, and U.S. Patent 3,035,923 to Geisler, issued on May 22, 1962. These compositions have very specific utilities and cannot be adapted to a wide variety of applications. One particularly significant shortcoming of these prior art edible fatty compositions colored with water soluble dyes is that they are not heat stable; that is, the coloring material does not remain uniformly dispersed when the fatty composition is heated and subsequently cooled.

It is an object of this invention to provide edible fatty compositions which contain water soluble-oil insoluble dyes, and a process for their preparation.

It is another object of this invention to provide heat stable suspensions of water soluble-oil insoluble dyes in liquid and plastic fatty compositions.

These and other objects can be achieved by preparing an edible fatty composition containing from about 0.1 to about 2000 parts per million, based upon the weight of the edible fatty composition, of a water soluble-oil insoluble dye, and an amount of a fatty acid ester of polyglycerol at least equal to the weight of the dye and not greater than about 5% by weight of the edible fatty composition, the fatty acid ester of polyglycerol containing $n$ glycerol units and a maximum of $n/2$ fatty acid radicals, wherein $n$ is an integer from 2 to about 30, and the fatty acid radicals contain from about 10 to about 24 carbon atoms.

These colored suspensions of water soluble-oil insoluble dyes (hereafter called "dyes") in edible fat are heat stable. The colored fat can be used at normal pan or deep frying temperatures (e.g., 300° F.–400° F.) without losing any portion of its color due to precipitation of the dye. In spite of repeated temperature changes, the color does not separate from the fatty material. This heat stability is quite surprising in light of the fact that substitution of other emulsifying agents for the above described esters of polyglycerol does not give the same result. None of the other materials tried, including lecithin, glycerin, monoglycerides of fatty acids, and various fatty acid esters of sorbitan, produced heat stable suspensions of the dyes in edible fats.

The edible fats which are useful in the products of this invention can be either normally liquid triglyceride compositions or normally plastic triglyceride compositions. Base oils for normally liquid triglyceride compositions can be derived from animal, vegetable or marine sources, and include, for example, such naturally occurring triglyceride oils as cottenseed oil, soybean oil, peanut oil, palm kernel oil, olive oil, corn oil, rapeseed oil, sunflower seed oil, sesame seed oil, safflower oil, sardine oil and the like. Also suitable oil fractions can be obtained from palm oil, lard and tallow as, for example, by fractional crystallization or directed interesterification, followed by separation of the oil. Oils predominating in glycerides of unsaturated acids may require partial hydrogenation to maintain flavor. Mixtures of any of the above oils can be used. Examples of normally liquid triglyceride compositions useful in preparing the colored edible fatty compositions disclosed herein are described, for example, in U.S. Patent 2,815,286, issued to Andre and Going on Dec. 3, 1957, and U.S. Patent 2,815,285, issued to Holman and Sanders on Dec. 3, 1957.

Normally plastic triglyceride compositions are fats which are non-pourable at ambient temperatures (70 to 100° F.), but which contain sufficient normally liquid oil and low melting solids that the composition is converted to a liquid well below frying temperatures. The base oil of such a plastic triglyceride composition generally is a normally liquid triglyceride oil. Uniformly dispersed in the base oil is sufficient high melting, highly hydrogenated triglyceride solids (commonly referred to as hardstock) to give the composition its plastic consistency. Generally, the highly hydrogenated triglyceride hardstock comprises from about 5% to about 50% by weight of the total composition. By and large, the fats and oils which are suitable for use in plastic shortenings are substantially the same as the base oils enumerated above for use in normally liquid triglyceride compositions. Examples of normally plastic fats which are useful in the compositions disclosed herein are described in U.S. Patent 2,801,177 issued to Lutton on July 30, 1957, and U.S. Patent 2,132,394 issued to Coith, Richardson and Votaw on Oct. 11, 1938.

Preferred triglycerides for use in either the normally liquid or normally plastic triglyceride compositions are soybean oil, cottonseed oil, palm oil, peanut oil, rapeseed oil and mixtures thereof.

The dyes for use in the compositions of this invention can be any water soluble-oil insoluble dye which is safe for human consumption. Generally this dye is one of those approved by the Food and Drug Commission for use in food, drug and cosmetic products. They are generally referred to as "FD&C dyes." A description of these dyes and their use in food products can be found, for example, in Kirk and Othmer, "Encyclopedia of Chemical Technology," Interscience Pub., New York, 1964, vol. 5, pp. 957–84. Typical examples of dyes useful in the present invention are FD&C Blue #2 (disodium salt of 5,5′-indigotindisulfonic acid), FD&C Green #1 (monosodium salt of 4-[4-(N-ethyl-p-sulfobenzylamino) diphenylmethylene]-[1 - N-ethyl-N-p-sulfoniumbenzyl)-$\Delta^{2,5}$-cyclohexadienimine]), FD&C #2 (trisodium salt of 1-(4-sulfo-1-naphthylazo)-2-naphthol-3,6-disulfonic acid), FD&C Yellow #5 (trisodium salt of 3-carboxy-5-hydroxy-1-p-sulfophenyl-4-p-sulfophenylazopyrazole), and FD&C Yellow #6 (disodium salt of 1-p-sulfophenylazo-2-naphthol-6-sulfonic acid).

The polyglycerol esters which are used in the colored edible fatty compositions of this invention to maintain the dye in suspension are commonly prepared from polyglycerol, a polymeriaztion condensation product of glycerol, which has the molecular formula $$H[OCH_2CHOHCH_2]_nOH,$$

where $n$ is the number of glycerol units in the molecule.

As with ordinary glycerol or other polyols, polyglycerols can be esterified by reaction with fatty acids. Esterification can take place at any or all of the hydroxyl groups, but generally occurs predominately at the secondary hydroxyl positions leaving the terminal hydroxyl group unaffected. Depending upon reaction conditions and the ratio of fatty acid to polyglycerol, the number of secondary hydroxyl groups which are esterified varies. By controlling the balance of esterified to unesterified hydroxyl groups, the lipophilic-hydrophilic balance of the polyglycerol ester can be varied. With an increasing number of esterified hydroxyl groups, the polyglycerol esters become progressively more lipophilic and progressively less hydrophilic.

This lipophilic-hydrophilic balance in the polyglycerol ester is important for purposes of this invention. It has been found that sufficient lipophilic properties are imparted to the polyglycerol ester by the fatty acid esterification of a single hydroxyl group. However to maintain sufficient hydrophilic properties in the molecule, the polyglycerol ester cannot contain more than about $n/2$ fatty acid radicals, $n$ being the number of glycerol units in the polyglycerol moiety of the polyglycerol ester. Preferably, the polyglycerol ester will contain between about $n/3$ and about $n/5$ fatty acid radicals. For example, if a fatty acid ester of decaglycerol $[H(OCH_2CHOHCH_2)_{10}OH]$ is used in the compositions of this invention, it can contain a maximum of about five fatty acid radicals. Preferably it will contain either two or three fatty acid radicals. Hexaglycerol $[H(OCH_2CHOHCH_2)_6OH]$ can contain a maximum of about three fatty acid radicals and preferably contains either one or two fatty acid radicals.

The minimum number of glycerol units in the polyglycerol esters used in the compositions of this invention is two. The maximum number is not material for purposes of this invention; however for reasons of ease of preparation, economics, and commercial availability the practical limit on the number of glycerol units in the polyglycerol esters is about thirty. The preferred number of glycerol units is from two to about ten.

The number of carbon atoms in the fatty acid radicals of the polyglycerol esters can be from about 12 to about 24, and preferably is from about 16 to about 20. The fatty acid radicals can be derived from the corresponding fatty acids, and can be saturated or unsaturated. Examples of these fatty acid radicals are lauroyl, myristoyl, palmitoyl, palmitoleoyl, stearoyl, oleoyl, linoleoyl, linolenoyl, arachidoyl, behenoyl and lignoceroyl radicals.

While it is customary to esterify the polyglycerol with a single type of fatty acid, polyglycerols which have been esterified with a mixture of fatty acids can be used in the compositions of this invention. Likewise, mixtures of various polyglycerol esters can be used. Typical examples of polyglycerols which are useful in compositions of this invention are triglycerol monostearate, tetraglycerol monooleate, hexaglycerol dipalmitate, octaglycerol trioleate, decaglycerol trilinoleate and decaglycerol pentapalmitate.

In preparing the colored edible fatty compositions of this invention, the first step is the mixing of the dye and the polyglycerol ester. While not essential, the mixing preferably is accomplished in the presence of water, in the manner more fully described below, in order to increase the rate of dissolution of the dye. It is desirable to use distilled water, since certain dyes can be precipitated by metallic ions present in most non-distilled water. Dissolution is most easily accomplished by dissolving the dye and the polyglycerol ester in water, preferably accompanied by heating of the mixture to from about 160° F. to 212° F.

Generally a solution suitable for use in coloring an edible fat can be obtained by mixing one part each of dye and polyglycerol ester, and three parts of water, if water is used. However it is usually more convenient to use a greater amount of polyglycerol ester and water. The upper limits on the amounts of polyglycerol ester and water used are determined by considerations of convenience and economics. In the preferred operation, the amount of polyglycerol ester does not exceed about 5% by weight of the edible fatty composition and most preferably is from about 0.5% to about 2.0% by weight of the edible fatty composition. Also in the preferred operation, the amount of water, if used, does not exceed about 5% by weight of the edible fatty composition, and most preferably does not exceed about 0.5% by weight of the edible fatty composition. To obtain an acceptable final product, water in excess of 0.5% by weight of the edible fatty composition should be removed by boiling or evaporation prior to addition of the dye mixture to the edible fat.

Once the dye-polyglycerol ester mixture is obtained (and, if necessary, its moisture content reduced to the desired level), the mixture is added to and intimately mixed with the edible fat which is to be colored. The mixing step can be performed in any appropriately sized mixing unit, such as a metal mixing tank equipped with a turbine agitator. Naturally, the fat should be in a liquid state to permit proper mixing. To produce a colored plastic fat, the fatty ingredients must be heated to the liquid state prior to mixing with the dye mixture, and subsequently rapidly chilled by any of the methods well known in the art to obtain the desired plastic consistency. For example, the rapid chilling can be conducted in a freezer such as a scraped wall heat exchanger. A suitable device for this purpose, referred to as a "Votator," is described in U.S. Reissue Patent 21,406 to Vogt, issued on Mar. 19, 1940.

The amount of dye added to the fatty composition may vary within wide ranges depending upon the particular dye used and the desired color of the fatty product which is being produced. The normal use levels, based on the total weight of the edible fatty composition, is from about 0.1 part per million to about 2000 parts per million, and preferably is from about 1 part per million to about 500 parts per million.

The colored edible fatty compositions disclosed herein also can contain additives which are commonly used in fatty compositions. The most common of these additives are emulsifiers, such as monoglycerides of fatty acids and various fatty acid ester derivatives of sorbitan, commonly sold under the trade names of "Spans" and "Tweens." These compositions also can contain crystal inhibitors, such as oxystearin, antioxidant agents such as methyl silicone, butylated hydroxyanisole and butylated hydroxytoluene, and other additives commonly used in edible fatty compositions.

The following examples are given to demonstrate the preparation of colored, heat stable, edible fatty compositions within the scope of this invention. These examples are not intended to be limitations upon the invention. Unless stated to the contrary, all percentages and ratios in the examples are on a weight basis.

EXAMPLE 1

A colored solution was prepared in a 100 milliliter beaker by mixing 0.08 gram of FD&C Yellow #5 dye (trisodium salt of 3-carboxy-5-hydroxy-1-p-sulfophenyl-4-p-sulfophenylazopyrazole) and 0.02 gram of FD&C Yellow #6 dye (disodium salt of 1-p-sulfophenylazo-2-naphthol-6-sulfonic acid) in 30 grams of 100° F. distilled water. To this mixture were added 15 grams of decaglycerol trilinoleate. While stirring, the mixture was heated slowly to boiling. The solution had a uniform bright yellow color, and none of the dye particles remained undispersed. Heating of the solution was continued until substantially all of the water was removed by evaporation.

Two and a half grams of this colored mixture were added to a 1000 milliliter beaker containing 400 grams of edible oil (refined and bleached soybean oil, partially hydrogenated to an iodine value of 107). After intimate hand stirring, the color was evenly distributed in the oil. After standing for one hour at room temperature, none of the dye precipitated out of the edible oil.

The colored solution was heated to 350° F. and maintained at that temperature for two hours. After being allowed to cool to room temperature and stand for one hour, the solution was observed. As before, the color remained evenly distributed in the oil, and none of the dye precipitated out of solution.

The colored oil then was used for the deep frying (350° F.) of French cut potatoes. The potato pieces acquired a slight yellow tint during frying which improved their appearance. The oil again was allowed to cool to room temperature and stand for one hour. As before, the oil retained an even yellow color and no dye precipitated out of solution.

When in the above example the decaglycerol trilinoleate is replaced in whole or in part by triglycerol monostearate, tetraglycerol monooleate, hexaglycerol dipalmitate, octoglycerol trioleate, decaglycerol pentapalmitate and mixtures thereof, substantially similar results are obtained in that heat stable suspensions of the dye in the edible oil are obtained.

Further when in the above example, the soybean oil is replaced in whole or in part by cottonseed oil, peanut oil, palm kernel oil, olive oil, corn oil, rapeseed oil, sunflower seed oil, sesame seed oil, safflower oil and sardine oil, substantially similar results are obtained in that heat stable suspensions of the dye in the edible oil are obtained.

EXAMPLE 2

A colored solution is prepared in a 100 milliliter beaker by mixing 0.05 gram of FD&C Red #2 dye (trisodium salt of 1 - (4-sulfo-1-naphthylazo)-2-naphthol-3,6-disulfonic acid) in 10 grams of 100° F. distilled water and 10 grams of tetraglycerol monooleate. The mixture is heated to 212° F. and allowed to boil until 8 grams of the water is removed.

A shortening composition is prepared by heating to 150° F. 500 grams of the following:

| Component— | Percent by weight |
|---|---|
| Base stock (refined, bleached soybean oil partially hydrogenated to an iodine value of about 107 and having a solids content index of 0.32 at 70° F.) | 86 |
| Hardstock (substantially completely hydrogenated soybean oil and substantially completely hydrogenated rapeseed oil in a weight ratio of of 5.33:1 and having an iodine value of 8) | 10 |
| Mono- and diglycerides of partially hydrogenated soybean and cottonseed oils (in a weight ratio of 85:15) having an iodine value of about 80 | 4 |

To this composition is added 5 grams of the colored mixture prepared above, and hand mixing is continued until the shortening composition is uniformly colored. The colored composition is then rapidly cooled by passing it through a scraped wall heat exchanger to reduce its temperature to 80° F. in about 20 seconds. Following the chilling, the colored shortening composition is passed through an agglomerator (picker box) and gently agitated for two minutes. The mixture is then sealed in 12 ounce jars and tempered for 24 hours at 80° F. The tempered product has a uniform pink color and a plastic consistency. This plastic shortening product is useful in all areas where shortening products are commonly used; and when used for frying, the color is heat stable.

What is claimed is:
1. The method of preparing a heat stable colored edible fatty composition which comprises mixing from about 0.1 to about 2000 parts per million, based upon the weight of the edible fatty composition, of water soluble-oil insoluble dye and an amount of fatty acid ester of polyglycerol at least equal to the weight of the dye and not greater than about 5% by weight of the edible fatty composition, the fatty acid ester of polyglycerol containing $n$ glycerol units, and a maximum of about $n/2$ fatty acid radicals, wherein $n$ is an integer from 2 to about 30, and the fatty acid radicals contain from about 10 to about 24 carbon atoms, and then intimately mixing the dye-polyglycerol ester mixture with normally liquid fatty triglyceride or normally plastic fatty triglyceride which is to be colored.

2. The method of claim 1 wherein the water soluble-oil-insoluble dye and the fatty acid ester of polyglycerol are mixed in the presence in an amount of water which is at least equal to three times the weight of the dye and not greater than about 5% by weight of the edible fatty composition.

3. The method of claim 1 wherein the amount of the fatty acid ester of polyglycerol is from about 0.5% to about 2.0% by weight of the edible fatty composition.

References Cited

Nash et al.: The Bakers Digest, October 1963, pp. 72–75.

MAURICE W. GREENSTEIN, Primary Examiner

H. H. KLARE III, Assistant Examiner

U.S. Cl. X.R.

99—118